United States Patent [19]

Bour

[11] 4,146,377
[45] Mar. 27, 1979

[54] METHOD OF USING BUSHING ENVIRONMENTAL CONTROL IN GLASS FIBER FORMING

[75] Inventor: Thomas C. Bour, Glenshaw, Pa.

[73] Assignee: PPG Industries, Inc., Pittsburgh, Pa.

[21] Appl. No.: 825,317

[22] Filed: Aug. 17, 1977

[51] Int. Cl.² ............................................ C03B 37/02
[52] U.S. Cl. .......................................... 65/4 R; 65/2; 65/5; 65/11 R; 65/12; 65/16
[58] Field of Search ............. 65/5, 4 R, 12, 16, 11 W, 65/2

[56] References Cited

U.S. PATENT DOCUMENTS

| | | | |
|---|---|---|---|
| 2,224,466 | 12/1940 | Baker et al. | 83/91 |
| 2,234,986 | 3/1941 | Slayter et al. | 49/17 |
| 2,291,289 | 7/1942 | Slayter et al. | 49/55 |
| 2,339,590 | 1/1944 | Thomas et al. | 49/1 |
| 2,961,698 | 11/1960 | Rea | 65/5 X |
| 3,021,558 | 2/1962 | Roberson | 65/16 X |
| 3,248,192 | 4/1966 | Millet | 65/5 |
| 3,304,163 | 2/1967 | Holschlag | 65/11 W |
| 3,532,479 | 10/1970 | Stalego | 65/16 |
| 3,547,610 | 12/1970 | Holman | 65/16 X |
| 3,836,346 | 9/1974 | Stalego | 65/16 X |
| 3,881,903 | 5/1975 | Stalego | 65/16 |
| 3,969,099 | 7/1976 | Reese et al. | 65/12 X |
| 4,003,731 | 1/1977 | Thompson | 65/12 |

Primary Examiner—Robert L. Lindsay, Jr.
Attorney, Agent, or Firm—Paul A. Leipold; Alan T. McDonald

[57] ABSTRACT

A method is disclosed for maintaining a uniform airflow and thus uniform thermal conditions below a bushing in a continuous glass fiber forming operation. The method comprises passing the glass filaments through an enclosure and blowing a gaseous fluid through the enclosure co-current with the filaments at a substantially constant volume and velocity to draw air downwardly with the filaments from all directions below the bushing at a substantially constant volume and velocity which thus provides a more uniform airflow and temperature below the bushing. The downward airflow velocity is insufficient to attenuate the filaments. Suitable apparatus for accomplishing this result is also disclosed. This apparatus comprises an enclosure for the filaments having a pair of chambers, the glass filaments being passed through the inner chamber and gaseous fluid being flowed from the outer chamber to the inner chamber at a substantially constant volume and velocity to flow co-current with the glass filaments.

4 Claims, 3 Drawing Figures

METHOD OF USING BUSHING ENVIRONMENTAL CONTROL IN GLASS FIBER FORMING

BACKGROUND OF THE INVENTION

In the formation of continuous glass fiber strands, glass filaments are typically attenuated through bushing tips or orifices located at the bottom of a heated bushing having molten glass therein. The filaments are attenuated through the bushing tips at speeds from about 1,000 to 15,000 feet per minute (304.8 to 4,572.0 meters per minute) or more. The filaments are drawn across the application surface of an applicator where they are coated with a binder and/or size to prevent abrasion and to add desired properties to the filaments. The filaments are then gathered into a unified strand in a gathering shoe, which is typically a grooved cylinder or wheel formed of material such as graphite, and are wound on a rotating collet as a forming package, with the rotation of the collet providing the attenuative forces necessary to form the filaments.

Glass filaments may range from about 0.0070 inch (0.0178 centimeter) and larger to about 0.00018 inch (0.0004572 centimeter) and smaller. These very small filaments can sustain only a very small tensile force before breaking and the breaking of a single filament among the hundreds or even thousands of filaments being drawn from a bushing requires an interruption of the forming process which reduces productivity and increases manufacturing costs.

Forces which break filaments in the forming process can originate from nonuniform thermal conditions in the space immediately below the bushing where the molten glass streams are attenuated and cooled. An increase in the rate of heat removal from an attenuating molten glass stream will increase its viscosity faster than desired, adding tension to the filaments being formed. If this added tension becomes sufficient to cause an increase in stress to the ultimate stress of the glass, the filament breaks. Changes in the air velocity or air temperature near the molten streams can change the viscosity and tension sufficiently to break the filaments.

The hundreds or even thousands of filaments being drawn downwardly from the bushing at speeds up to 15,000 feet per minute (4,572 meters per minute) or more drag surrounding air downwardly with them. The air being dragged downward by the speeding filaments is replaced by air from the immediate vicinity of the bushing, and it is not uncommon for the air to be sucked away from the forming cone directly below the bushing tips to satisfy the need below. When this occurs, the forming cone space draws air from its surroundings to replace the air stolen by the filaments. If this replacement air in the forming cone zone is erratic in either velocity or temperature, the stage is set for an interruption in production due to filament breakout based upon a change in air velocity and/or air temperature.

Just as a temporary excess of airflow below the bushing can cause filament breakage from high tension resulting from too rapid cooling of the molten glass forming cone, a temporary deficiency of airflow below the bushing can result in fiber disruption due to insufficient cooling of the forming cone and consequent separation of the glass stream as a result of the pinching forces of surface tension.

It is desirable, therefore, to reduce or eliminate erratic airflow and air temperature immediately below the bushing tips and thus to provide a more uniform airflow and uniform temperature in the region below the bushing.

It is known to attenuate discontinuous glass fibers by means of high velocity downward gas or steam jets. Typical of this attenuation are the methods shown in U.S. Pat. Nos. 2,224,466; 2,234,986; 3,021,558; 3,532,479; 3,547,610; 3,836,346 and 3,881,903. The velocities of the gas jets employed to attenuate the discontinuous fibers typically ranges from about 150 to 1700 feet per second (45.7 to 518.2 meters per second).

While these high gas velocities may be employed in the production of discontinuous glass fibers, such high gas velocities cannot be tolerated in the production of continuous glass fibers. These high velocities disrupt the operation of the bushing, due to erratic turbulent flow and thus erratic airflow and temperatures below the bushing, resulting again in discontinuous filaments. Thus, it is a further objective of the present invention to control the environment below a continuous glass fiber forming bushing with gas of a volume and velocity sufficient to produce uniform airflow and temperatures below the bushing but insufficient to attenuate the filaments or produce turbulent airflow below the bushing.

THE PRESENT INVENTION

By means of the present invention, air velocity and temperature variations below the bushing tips of a continuous glass fiber forming bushing can be substantially reduced or eliminated. The present invention comprises passing the glass filaments as they are attenuated from the bushing downwardly through an enclosure approximately vertically spaced at a distance below the bushing. This enclosure has an inner and an outer chamber. The glass filaments pass through the inner chamber. The outer chamber is connected to a source of gaseous fluid such as air, nitrogen, oxygen, carbon dioxide, and the like. This gaseous fluid flows through the outer chamber at a substantially constant volume and velocity. The inner and outer chambers are connected by means of an opening designed to allow all of the gaseous fluid in the outer chamber to pass through the inner chamber co-current with the filament flow through the inner chamber. At the point where the inner and outer chambers are connected, the dimensions of the inner chamber are smaller than at the points where the filaments enter and where the gaseous fluid and filaments exit the inner chamber. This produces a venturi effect which draws air from above the unit and below the bushing from all directions through the inner chamber at a substantially constant volume and velocity along with the glass filaments. The air is drawn to the inner chamber at this substantially constant volume and velocity from all directions to result in a more uniform and constant airflow directly below the bushing tips and into the apparatus. This uniform, laminar airflow substantially reduces or eliminates variations in velocity and temperature below the bushing tips and thus removes heat from the bushing tips at a substantially constant rate thus substantially reducing the chances of breakouts of the filaments caused by erratic airflow and temperatures below the bushing tips. The downward airflow through the enclosure is, however, insufficient in velocity to attenuate the filaments. In addition, the present invention isolates the bushing from the harmful effects caused by adjacent bushings and their operation.

BRIEF DESCRIPTION OF THE DRAWINGS

The method of the present invention will be more fully described with reference to the drawings in which.

DETAILED DESCRIPTION OF THE DRAWINGS

Figure 1:
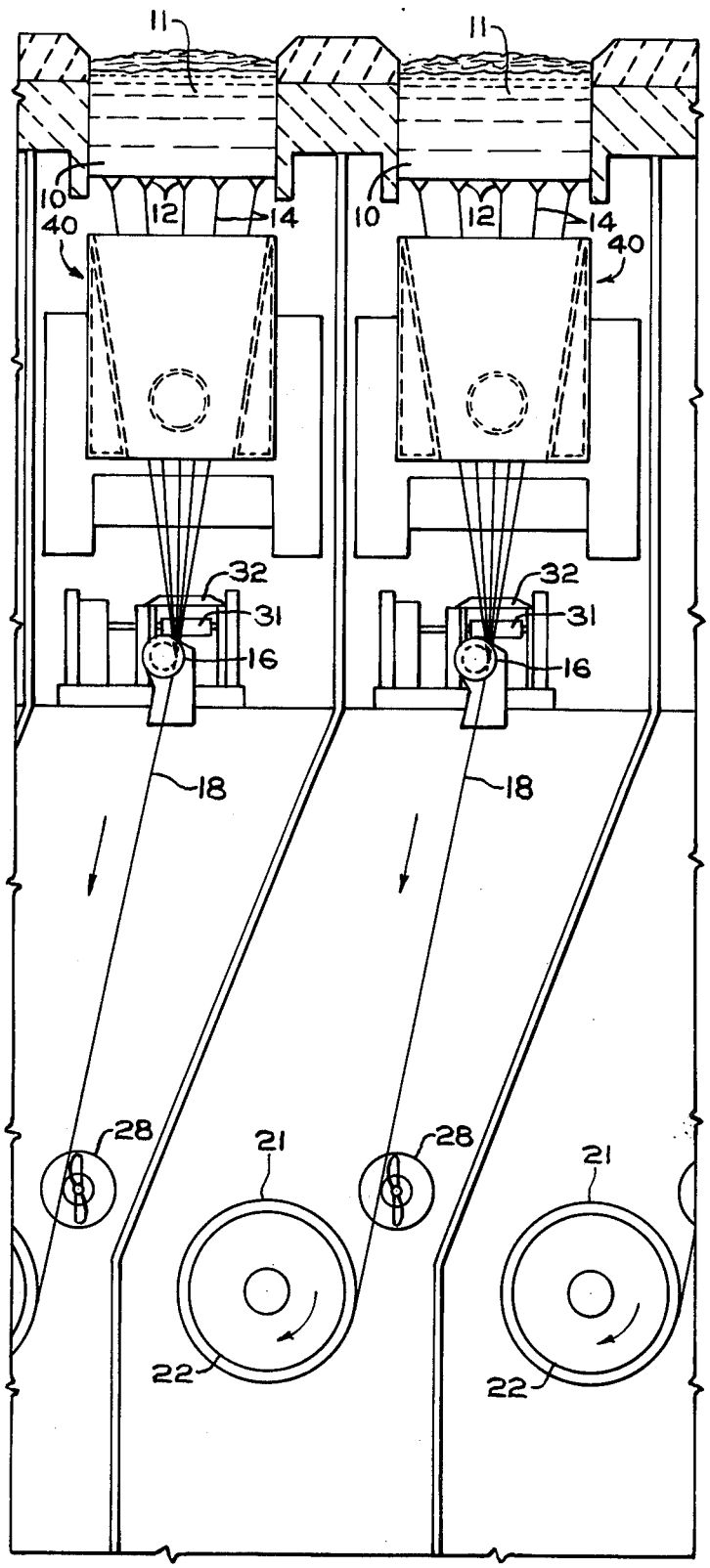
FIG. 1 is a front elevational view of a typical continuous glass fiber forming operation including the airflow control system of the present invention.

Turning now to FIG. 1, molten glass 11 is contained within a heated glass fiber forming bushing 10. The bushing 10 contains a plurality of bushing tips 12 at its bottom through which continuous glass filaments 14 are attenuated. The filaments 14 are formed from small cones at the bottom of the bushing tips 12 as these cones are drawn into the filaments 14. The filaments 14 are then passed downwardly and through the airflow control apparatus 40 which will be more fully described below. This apparatus 40 is vertically spaced from the bushing tips 12. Typically, this spacing is from about 2 to 6 inches (5.08 to 15.24 centimeters), more or less, below the bushing tips. This spacing will vary according to the size of the bushing and the type of filaments being produced. As the filaments 14 exit this apparatus 40, they are passed across the application surface 31 of an applicator 32 where they are coated with a binder and/or size. The coated filaments 14 are then gathered into a unified strand 18 by passing them across the grooved surface of a gathering shoe 16. This gathering shoe 16 typically is a graphite wheel or cylinder having a groove in its surface across which filaments 14 pass and in which they are gathered into a unified strand 18. The strand 18 is then traversed across the face of a rotating spiral 28 and is gathered in a generally criss-cross pattern as a forming package 21 on the face of a rotating collet 22. Optionally, the strand 18 could be attenuated by a belt or wheel attenuator and collected in a container or on a moving surface as a mat.

Figure 2:
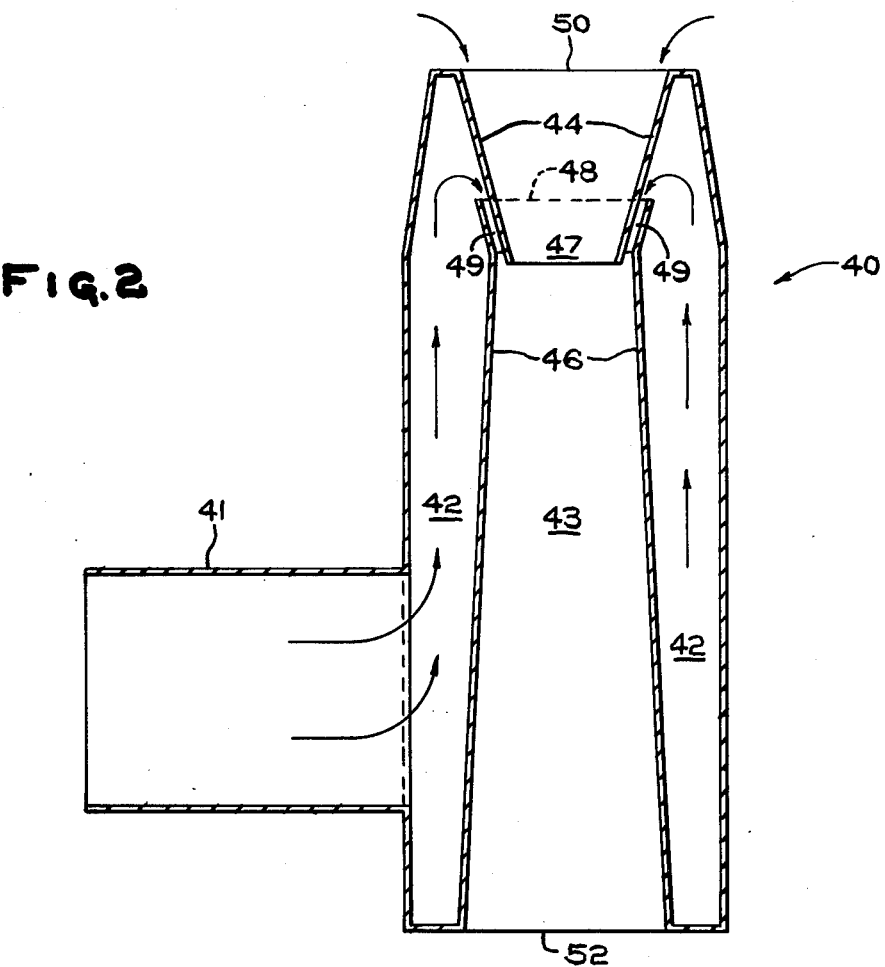
FIG. 2 is a side sectional view of the airflow control apparatus employed in the present invention.
Figure 3:
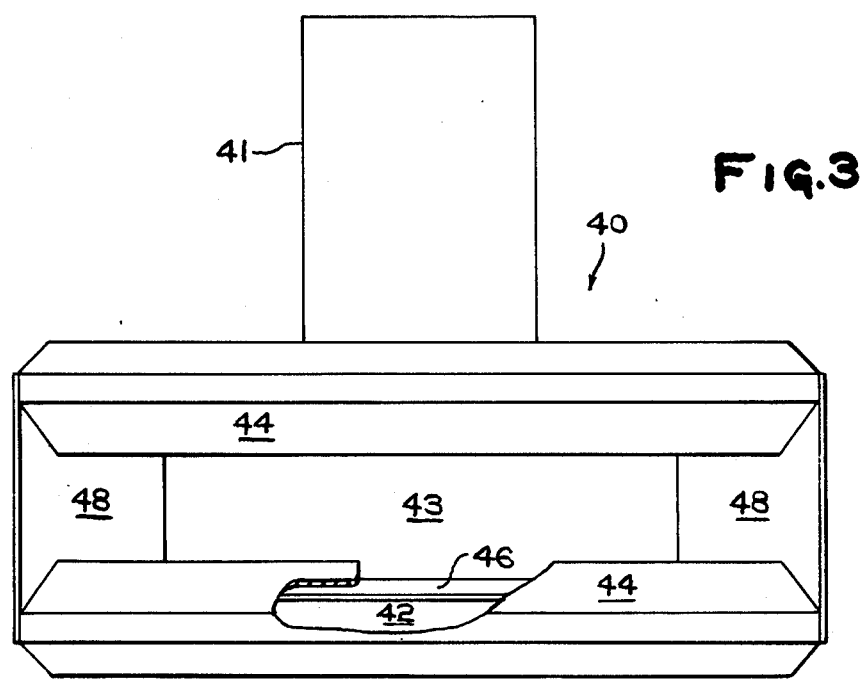
FIG. 3 is a top view, partially broken away, illustrating the relationship between the inner and outer chambers of the airflow control apparatus.

FIGS. 2 and 3 illustrate the airflow control apparatus employed in the present invention. The apparatus 40 comprises an intake duct 41 connected in fluid transfer relation to an outer chamber 42. The intake duct 41 is in turn connected to a source of gaseous fluid, such as air, nitrogen, oxygen, carbon dioxide, and the like which enters the duct 41 at a substantially constant rate. Typical of the gas flow rates employed are from about 100 to 300 cubic feet per minute (2.83 to 8.49 cubic meters per minute) and preferably from about 150 to 200 cubic feet per minute (4.25 to 5.66 cubic meters per minute). These flow rates will vary according to the specific needs of the different bushings employed. The gaseous fluid flowing within the outer chamber 42 can exit only through the two openings 49 which connect the outer chamber 42 with an inner chamber 43. The inner chamber 43 is surrounded by the outer chamber 42 on all sides.

The glass filaments 14 pass downwardly through the inner chamber 43. The inner chamber 43 has an upper opening 50 through which the glass filaments 14 enter and a bottom opening 52 through which the glass filaments 14 exit. The inner chamber 43 and outer chamber 42 are preferably generally rectangular. Walls 44 and 46 which separate the inner chamber 43 from the outer chamber 42 are designed such that a narrower opening 47 is formed in the inner chamber 43 at the point where the air from the outer chamber 42 enters the inner chamber 43 through the openings 49 than the openings 50 and 52 through which the glass filaments enter and exit. Walls 44, 49 and 46 define a venturi within enclosure 40, with the air entering the inner chamber 43 of the enclosure 40 at or about the throat of the venturi. Preferably, at this narrow opening 47, walls 44 and 46 do not meet. Rather, the walls are separated by the openings 49 through which the gaseous fluid from the outer chamber 42 passes to the inner chamber 43. Optionally, walls 44 and 46 could meet, or be a single wall, with a plurality of openings in the walls at the point where the gaseous fluid enters the inner chamber 43. Side walls 48 help guide the flow of the gaseous fluid in the downward direction so that the gaseous fluid flows co-current with the glass filaments 14 to the exit opening 52 in the inner chamber 43. This downward flow of the higher velocity gaseous fluid draws air from all directions from below the bushing into the opening 50 along with glass filaments 14 as they enter the apparatus 40. The walls 46 separating the inner chamber 43 and the outer chamber 42 are preferably angled, as shown in FIG. 1, to provide a large volume for the outer chamber to minimize resistance to flow and to give substantially uniform airflow within the chamber 42, as well as to provide a larger cross section for flow at the exit end of the inner chamber 43 to prevent flow back or upward flow. Since the gaseous fluid flow to the duct 41 is at a substantially constant rate, the airflow into the apparatus 40 is also at a substantially constant rate from all directions. The purpose of the narrow opening 47, as opposed to an opening equal in size to either of the openings 50 and 52, is to eliminate flow back of the gaseous fluid and/or air which enters the apparatus 40 and, by venturi effect, to direct all of the gases in a downward direction to exit opening 52. Typically, the gas velocity, at the openings 47 and 52 may range from about 2 to 15 feet per second (0.61 to 4.57 meters per second). The dimensions of the apparatus 40 will vary with the size of the bushing employed.

The substantially constant airflow into the opening 50 results in a more uniform airflow above the apparatus 40, i.e., more uniform airflow below the bushing tips 12. This substantially uniform, streamlined, laminar airflow will result in more uniform air velocities and more uniform temperatures below the bushing tips 12 and substantially reduces breakouts of the fine filaments 14 due to erratic airflow and/or temperatures below the bushing tips 12. This airflow is, however, insufficient to attenuate the filaments, being typically in the range of from about 1 to 10 feet per second (0.31 to 3.1 meters per second) in velocity.

The apparatus 40 is formed of a material which can withstand the hot and damp environment in a glass fiber forming level. A particularly suitable material is stainless steel.

EXAMPLE

Employing the apparatus as illustrated in the figures, 1600 C-75 continuous glass filaments having an average diameter of 0.00018 inch (0.0004572 centimeters) were attenuated from a bushing at a speed of 11,600 feet per minute (3,535.8 meters per minute). The opening 50 at the top of the air control apparatus was 82.5 square inches (532.3 square centimeters). The opening 47 at the inlet between the inner and outer chambers was 54.25 square inches (350.0 square centimeters). The opening 52 at the exit of the apparatus was 62.5 square inches (403.2 square centimeters). While entering airflows were not measured, at the exit airflows of between 110 and 185 cubic feet per minute (3.1 and 5.2 cubic meters per minute) and velocities of between 4.22 and 7.10 feet per minute (1.29 and 2.16 meters per minute) were measured. Substantially fewer filament breakouts under the bushing were noticed than is normally obtained without the air control apparatus.

From the foregoing, it is obvious that the present invention provides a method and apparatus for substantially improving the environment below the bushing tips in a glass fiber forming operation.

While the invention has been described with reference to specific embodiments thereof, it is not intended to be so limited thereby except as set forth in the accompanying claims.

I claim:

1. In a method of forming continuous glass fibers comprising attenuating glass filaments from molten glass contained in a bushing, gathering the filaments into strand and collecting the strand, the improvement comprising passing the filaments downwardly through an enclosure, said enclosure being vertically spaced below the bushing and having a venturi therein, directing a gaseous fluid co-current with the filaments from at or adjacent the throat of the venturi and drawing air below the bushing from all directions and into said enclosure in laminar flow, said air being directed at a rate sufficient in velocity and volume to maintain substantially constant airflow and temperatures below the bushing, but sufficient in rate to attenuate the filaments.

2. The method of claim 1 wherein said air velocity below the bushing is between about 1 and 10 feet per second (0.31 and 3.1 meters per second).

3. The method of claim 1 wherein said gaseous fluid is directed at a velocity of between about 2 and 15 feet per second (0.61 and 4.57 meters per second).

4. The method of claim 1 further comprising removing heat from the filaments at a substantially constant rate with said air.

* * * * *

UNITED STATES PATENT AND TRADEMARK OFFICE
CERTIFICATE OF CORRECTION

PATENT NO. : 4,146,377

DATED : March 27, 1979

INVENTOR(S) : Thomas C. Bour

It is certified that error appears in the above—identified patent and that said Letters Patent are hereby corrected as shown below:

In claim 1, column 6, line 12, "sufficient" should read --insufficient--.

Signed and Sealed this

Twenty-sixth Day of June 1979

[SEAL]

Attest:

RUTH C. MASON
*Attesting Officer*

DONALD W. BANNER
*Commissioner of Patents and Trademarks*